US010943125B1

(12) United States Patent
Evans et al.

(10) Patent No.: US 10,943,125 B1
(45) Date of Patent: Mar. 9, 2021

(54) PREDICTING HIGHLIGHTS FOR MEDIA CONTENT

(71) Applicant: Facebook, Inc., Menlo Park, CA (US)

(72) Inventors: Samuel Evans, New York, NY (US); Matthew Alexius Labunka, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 42 days.

(21) Appl. No.: 16/219,911

(22) Filed: Dec. 13, 2018

(51) Int. Cl.
*G06K 9/00* (2006.01)
*G06F 16/954* (2019.01)
*H04N 21/472* (2011.01)

(52) U.S. Cl.
CPC ....... *G06K 9/00744* (2013.01); *G06F 16/954* (2019.01); *G06K 9/00724* (2013.01); *H04N 21/472* (2013.01)

(58) Field of Classification Search
CPC .................. G06K 9/00744; G06K 9/00724
See application file for complete search history.

(56) References Cited

U.S. PATENT DOCUMENTS

| | | | | |
|---|---|---|---|---|
| 5,973,250 A * | 10/1999 | Zirille | ...................... | G10H 1/26 84/600 |
| 8,219,555 B1 * | 7/2012 | Mianji | ...................... | G06F 16/38 707/736 |
| 8,566,315 B1 * | 10/2013 | Davtchev | ................ | G06F 16/78 707/736 |
| 9,268,858 B1 * | 2/2016 | Yacoub | ............... | G06F 16/9535 |
| 9,852,215 B1 * | 12/2017 | Sullivan | ................ | G06F 16/335 |
| 10,104,427 B1 * | 10/2018 | Zabetian | ............ | H04N 21/4627 |
| 2007/0265720 A1 * | 11/2007 | Sako | ..................... | G11B 27/105 700/94 |
| 2011/0113320 A1 * | 5/2011 | Neff | ...................... | G06F 40/169 715/230 |
| 2012/0324491 A1 * | 12/2012 | Bathiche | ................ | H04H 60/33 725/10 |
| 2013/0007787 A1 * | 1/2013 | John | .................. | H04N 21/4622 725/10 |
| 2013/0326406 A1 * | 12/2013 | Reiley | ..................... | G06F 3/048 715/810 |
| 2015/0229975 A1 * | 8/2015 | Shaw | ...................... | G06F 16/24 725/10 |
| 2016/0073168 A1 * | 3/2016 | Gardes | ............... | H04N 21/4788 725/32 |
| 2016/0105708 A1 * | 4/2016 | Packard | ........... | H04N 21/23439 725/10 |
| 2016/0105733 A1 * | 4/2016 | Packard | ........... | H04N 21/25841 725/32 |
| 2016/0105734 A1 * | 4/2016 | Packard | ........... | H04N 21/23109 725/32 |
| 2016/0294894 A1 * | 10/2016 | Miller | ............... | G06F 16/24578 |

(Continued)

*Primary Examiner* — Shourjo Dasgupta
(74) *Attorney, Agent, or Firm* — Jordan IP Law, LLC

(57) ABSTRACT

In one embodiment, a method includes accessing a first video; predicting a first noteworthy portion for the first video, wherein the first noteworthy portion is a portion of the first video that is predicted based on user-engagement information associated with the portion of the first video; extracting a first highlight from the first video, wherein the first highlight corresponds to the first noteworthy portion; and sending, to a client system of a user, information configured to render the first highlight and a first interactive element that is configured to launch the first video on the client system.

20 Claims, 10 Drawing Sheets

(56) References Cited

U.S. PATENT DOCUMENTS

| | | | |
|---|---|---|---|
| 2017/0070779 A1* | 3/2017 | Kim .................... G11B 27/00 |
| 2017/0185589 A1* | 6/2017 | Neff .................. G06F 16/9535 |
| 2017/0220568 A1* | 8/2017 | Dombrowski ........... H04N 5/77 |
| 2017/0278545 A1* | 9/2017 | Woodward, Jr. ...... G11B 27/031 |
| 2017/0330598 A1* | 11/2017 | Choi .................... G11B 27/19 |
| 2018/0025078 A1* | 1/2018 | Quennesson ........... G06F 16/00 |
| | | | 725/141 |

\* cited by examiner

US 10,943,125 B1

PREDICTING HIGHLIGHTS FOR MEDIA CONTENT

TECHNICAL FIELD

This disclosure generally relates to predicting noteworthy portions of media content.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

The supply of media content such as video content continues to grow, for example on online social networks. Given this growth in supply, it is imperative to foster growth in user demand for such content by providing functionalities for sharing, promoting, and discovering such content. Highlight reels have long been popular in sports, and they have traditionally served the purpose of merely compiling noteworthy moments in a sporting event. This disclosure proposes using highlights as a solution to the task of growing user demand for video content and for improving user experience when viewing video content. The disclosure contemplates predicting portions of a video that are noteworthy and presenting these portions as highlights that may be quickly shared by users, for example, on an online social network. This sharing may allow other users to discover the video or pique their interest in viewing related videos. It may also increase user engagement with the highlight or the video from which the highlight was extracted. For example, social connections of a user may comment on a post by the user that includes a highlight, or may otherwise engage with a video as a result of the highlight being shared. Although this disclosure focuses on video content, it contemplates other types of media content, such as audio content.

If highlights are to be used for promoting video content, the portions included in a highlight of a video may need to be sufficiently noteworthy to cause other users to be interested in the video. It would be useful if a computing system could predict what portions of a video are noteworthy enough. A portion may be noteworthy for any number of reasons, and the factors that determine how noteworthy a portion is may be heavily steeped in context. As such, it can be difficult for a computing system (such as a server of an online social network) that may receive a large number of videos associated with a large variety of contexts to determine what portions are noteworthy for a particular video in a particular context. For example, a portion of a football video that includes a lot of visual movement or action may be a noteworthy portion within the context of a football game. However, a portion of a standup comedy video that includes a funny punchline may be a noteworthy portion in the context of a standup-comedy routine, even though there may have been very little visual movement or action during this portion. It is difficult for a computing system to be able to distinguish among these varied contexts and determine noteworthy portions of videos solely by analyzing the video content itself. This disclosure contemplates a shortcut method that effectively crowdsources this task to human users—e.g., by looking at information from user engagement or views to predict what portions of a video are noteworthy.

In particular embodiments, a computing system may access a video. In particular embodiments, the computing system may predict a noteworthy portion for the video. The computing system may predict that a portion is noteworthy based on, for example, user-engagement information associated with the portion. The computing system may, in some embodiments, also consider other factors such as information associated with a user for whom the noteworthy portion is being predicted. The computing system may extract a highlight from the video that corresponds to the predicted noteworthy portion. In particular embodiments, this process may be performed multiple times for a video to predict multiple noteworthy portions and extract multiple highlights for the video. The computing system may send, to a client system of a user, information configured to render a highlight. This information may include information corresponding to a suitable video encoding (e.g., an MPEG video), a series of image frames (e.g., an animated GIF), or any suitable format. The computing system may also send one or more interactive elements, such as an interactive element that is configured to launch the video on the client device, an interactive element that subscribes the user to a creator or uploader associated with the video, or an interactive element that suggests related videos. By presenting these interactive elements, the computing system may encourage interested users to try viewing the entire video by helping users quickly and seamlessly navigate to the video (e.g., without having to search for the video). The interactive elements may also help users discover other videos that may be interesting to the user (e.g., as may be inferred from the user having been interested enough to view the presented highlight).

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
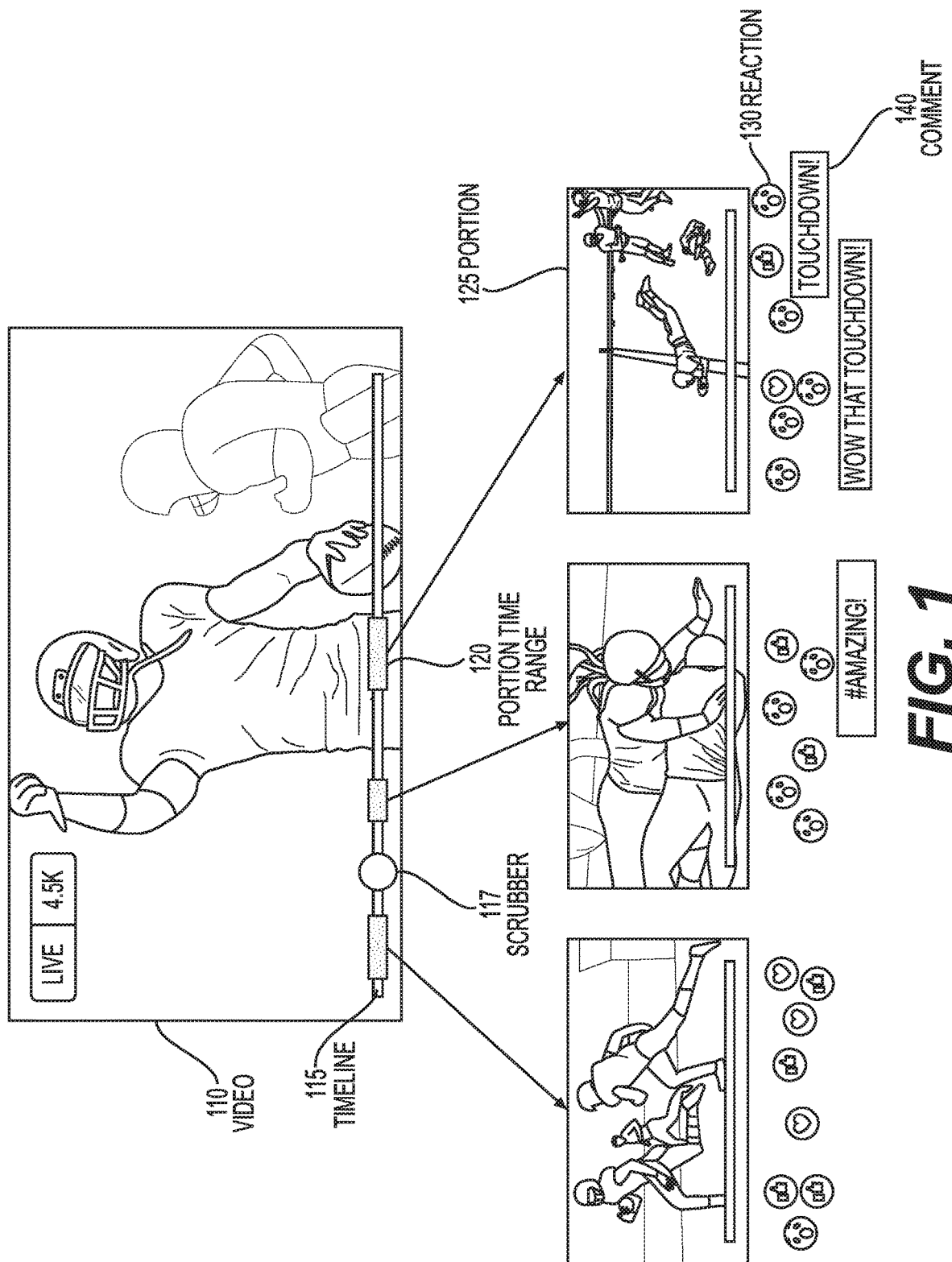
FIG. 1 illustrates an example of predictions of noteworthy portions within a video.

The supply of media content such as video content continues to grow, for example on online social networks. Given this growth in supply, it is imperative to foster growth in user demand for such content by providing functionalities for sharing, promoting, and discovering such content. Highlight reels have long been popular in sports, and they have traditionally served the purpose of merely compiling noteworthy moments in a sporting event. This disclosure proposes using highlights as a solution to the task of growing user demand for video content and for improving user experience when viewing video content. The disclosure contemplates predicting portions of a video that are noteworthy and presenting these portions as highlights that may be quickly shared by users, for example, on an online social network. This sharing may allow other users to discover the video or pique their interest in viewing related videos. It may also increase user engagement with the highlight or the video from which the highlight was extracted. For example, social connections of a user may comment on a post by the user that includes a highlight, or may otherwise engage with a video as a result of the highlight being shared. Although this disclosure focuses on video content, it contemplates other types of media content, such as audio content.

If highlights are to be used for promoting video content, the portions included in a highlight of a video may need to be sufficiently noteworthy to cause other users to be interested in the video. It would be useful if a computing system could predict what portions of a video are noteworthy enough. A portion may be noteworthy for any number of reasons, and the factors that determine how noteworthy a portion is may be heavily steeped in context. As such, it can be difficult for a computing system (such as a server of an online social network) that may receive a large number of videos associated with a large variety of contexts to determine what portions are noteworthy for a particular video in a particular context. For example, a portion of a football video that includes a lot of visual movement or action may be a noteworthy portion within the context of a football game. However, a portion of a standup comedy video that includes a funny punchline may be a noteworthy portion in the context of a standup-comedy routine, even though there may have been very little visual movement or action during this portion. It is difficult for a computing system to be able to distinguish among these varied contexts and determine noteworthy portions of videos solely by analyzing the video content itself. This disclosure contemplates a shortcut method that effectively crowdsources this task to human users—e.g., by looking at information from user engagement or views to predict what portions of a video are noteworthy.

In particular embodiments, a computing system may access a content item, which may be a video. In particular embodiments, the computing system may predict a noteworthy portion for the video. The computing system may predict that a portion is noteworthy based on, for example, user-engagement information associated with the portion. The computing system may, in some embodiments, also consider other factors such as information associated with a user for whom the noteworthy portion is being predicted. The computing system may extract a highlight from the video that corresponds to the predicted noteworthy portion. In particular embodiments, this process may be performed multiple times for a video to predict multiple noteworthy portions and extract multiple highlights for the video. The computing system may send, to a client system of a user, information configured to render a highlight. This information may include information corresponding to a suitable video encoding (e.g., an MPEG video), a series of image frames (e.g., an animated GIF), or any suitable format. The computing system may also send one or more interactive elements, such as an interactive element that is configured to launch the video on the client device, an interactive element that subscribes the user to a creator or uploader associated with the video, or an interactive element that suggests related videos. By presenting these interactive elements, the computing system may encourage interested users to try viewing the entire video by helping users quickly and seamlessly navigate to the video (e.g., without having to search for the video). The interactive elements may also help users discover other videos that may be interesting to the user (e.g., as may be inferred from the user having been interested enough to view the presented highlight).

In particular embodiments, a computing system may access a content item. In particular embodiments, this content item may be a video, and may be referred to herein as the "first video" for convenience. As used herein, the term "video" may refer to a live video or a pre-recorded video. In particular embodiments, the first video may be associated with a publisher or a creator of the first video. As used herein, the term "publisher" refers to a user or entity that has uploaded a video, or otherwise shares or reshares the video (e.g., on an online social network). As used herein, the term "creator" refers to a user or entity that created the original instance of the video. In particular embodiments, the computing system may be a server computing machine (e.g., the social-networking system 660). In particular embodiments, the computing system may have received the first video from a computing device of a publisher or a creator of the first video. As an example and not by way of limitation, the computing device may be a client system associated with the sports broadcasting entity ACME Sports that has uploaded the video to an online social network (e.g., on a page or interface associated with ACME Sports). Although this largely focuses on video content, the content item being accessed may also be of another type such as audio (for which analogous methods may be performed).

In particular embodiments, a noteworthy portion of the first video may be identified by a publisher or a creator of the first video. As an example and not by way of limitation, a creator of a video of a concert (e.g., a user who captured the video on a mobile device) may specify portions of a video that are noteworthy when uploading the video (or after uploading the video). For example, the user may specify one or more time ranges during which band members performed a solo as corresponding to a noteworthy portion. In particular embodiments, a noteworthy portion of the first video may be identified by a viewer user—i.e., a person who has viewed or is viewing the first video. As an example and not by way of limitation, a viewer user viewing a football game may specify a time range during which the user's favorite player catches the ball as corresponding to a noteworthy portion.

FIG. 1 illustrates an example of predictions of noteworthy portions within a video. In particular embodiments, one or more noteworthy portions of the first video may be predicted by the computing system. As an example and not by way of limitation, referencing FIG. 1, the portion 120, corresponding to the portion time range 125, may be predicted as one of several noteworthy portions of the video 110. The computing system may predict that a portion is noteworthy via one or more suitable algorithms or using a machine learning model. In particular embodiments, the computing system may calculate a noteworthiness-score for a portion based on any combination of suitable information, such as the information described herein. In particular embodiments, the noteworthiness-score for a portion may be a weighted sum of different sub-scores, each sub-score being calculated based on different combinations of factors. As an example and not by way of limitation, a first sub-score may be calculated based on a number of reactions that occur during a portion, and a second sub-score may be calculated based on a number of comments that occur during the portion, while a third sub-score may be calculated based on a number of reactions and a number of shares that occur during the portion. In this example, the noteworthiness-score may be based on the result of the following expression $Af_1+Bf_2+Cf_3$, where $f_1$ is a function that calculates the first sub-score, $f_2$ is a function that calculates the second sub-score, $f_3$ is a function that calculates the third sub-score, and where A, B, and C are weights. In particular embodiments, a portion may be noteworthy if it exceeds a threshold noteworthiness-score. In particular embodiments, the computing system may rank portions of a video based on their noteworthiness-score and predict that portions above a threshold rank are noteworthy (e.g., the top three scores). The number of noteworthy portions that are predicted for a given video may be based on the length of the video, the content-type of the video (e.g., sports, music video, movie, standup comedy), or some other suitable factor. As an example and not by way of limitation, a relatively short video may have a relatively small number of noteworthy portions predicted for it, and a relatively long video may have a relatively large number of noteworthy portions predicted for it. As another example and not by way of limitation, a music video may have a relatively small number of noteworthy portions predicted for it, and a sports video may have a relatively large number of noteworthy portions predicted for it, based on the content type. Although this disclosure focuses on a description of the prediction being performed with a scoring/ranking feature, it contemplates predicting noteworthy frames without any scoring or ranking.

In particular embodiments, the prediction of noteworthy portions may be based on user-engagement information associated with the portion of the first video. User-engagement information for a portion may include information about user-engagement actions from users actively engaging with the portion, and may include information about a point of time in the first video during which a user engagement occurred. User-engagement actions may be positive factors that support the noteworthiness of a portion (although some user-engagement actions may be negative factors, as further explained below). A suitable user-engagement action that occurs within a time range that encompasses a portion of a video may be associated with that portion of the video. User-engagement actions may include reactions, comments, or reshares. As used herein, the term "reactions" refers to an input that expresses a user's reaction to content (e.g., a "like" reaction, a "love" reaction, a "haha" reaction, a "wow" reaction, a "sad" reaction, an "angry" reaction). In particular embodiments, the computing system may predict that a portion is noteworthy if there is a large amount of user engagement associated with the portion. As an example and not by way of limitation, referencing FIG. 1, a large number of users may submit a "wow" reaction (as represented within FIG. 1 by, for example, the reaction 130 which may have been submitted by a user during the portion 125) at a time point that is within a time range encompassing exciting portions of a football video, such as the portion 125 during which a touchdown occurred. In this example, the computing system may predict that portions of the video where there are peaks in the number of "wow" reactions (or some combination of other suitable reactions) are noteworthy. As another example and not by way of limitation, referencing FIG. 1, a large number of comments may be submitted during a noteworthy portion, such as the comment 140 (including the text "touchdown!"). In this example, the portion may receive a relatively high noteworthiness-score as a result of the large number of comments. As another example and not by way of limitation, a large number of users may reshare the video (e.g., on an online social network) during a noteworthy portion. In particular embodiments, user-engagement information may include information about the content of user-engagement actions. As an example and not by way of limitation, the computing system may consider the text of comments associated with a portion in predicting whether it is noteworthy. For example, a comment with the text "touchdown!" (e.g., the comment 140 in FIG. 1) that was submitted during a portion may support the noteworthiness of the portion (thereby increasing the noteworthiness-score of a portion), while a comment with the text "this is boring" may not support the noteworthiness of the portion. As another example and not by way of limitation, certain types of user-engagement actions may increase the noteworthiness-score of a portion more than others. For example, a "love" reaction may increase the noteworthiness-score of a portion more than a "like" reaction (e.g., because a "love" reaction may be deemed a stronger expression of interest in a portion than a "like" reaction).

User-engagement information for a portion may include information about a number of views associated with the portion or the number of users who have viewed the portion (as determined by the number of views of, or the number of users who have viewed, A video during a particular time range within which the portion occurs in the video). As an example and not by way of limitation, a noteworthy portion of a video may be viewed a relatively large number of times, while a portion that is not noteworthy may be viewed less often. As another example and not by way of limitation, a relatively large number of users may tune into a live broadcast video when a noteworthy moment occurs (and may subsequently tune out after the noteworthy moment has passed). In these examples, the number of views for a portion (or the number of unique viewers who have viewed the portion) may be used to predict that the portion is noteworthy.

In particular embodiments, the prediction of noteworthy portions may be based on information associated with the user to whom the noteworthy portions are intended to be sent as highlights. In this way, the noteworthy portions that are predicted may be customized for the intended user and may track the interests of the intended. Consequently, the intended user may be more likely to find the predicted noteworthy portions to be subjectively noteworthy. In particular embodiments, the information associated with the user may be based on social-networking information associated with the user. The social-networking information may include a determined affinity between the user and a concept associated with a portion. As an example and not by way of limitation, a portion may receive a relatively high noteworthiness-score if the user has a relatively high affinity for one or more concepts associated with the portion. A concept may be associated with a portion by any suitable means. As an example and not by way of limitation, a concept may be associated with a noteworthy portion based on user engagement information. For example, comments submitted by users during a portion that include the text "mountain biking" may cause the concept "Mountain Biking" to be associated with the portion. As another example and not by way of limitation, a concept may be associated with a portion based on a content analysis of the portion, which may be performed by any suitable technique. For example, an image recognition analysis may determine that a portion is related to the concept "Mountain Biking" based on visual features recognized in the image frames during the portion. Alternatively or additionally, an analysis of the audio during a portion may be used to determine a concept associated with a portion (e.g., recognizing the voice of a particular person and associating the portion with a concept representing that particular person; recognizing a particular sound effect of a gunshot and associating the portion with the concept "Gun," recognizing the words "captain America" being spoken by a character and associating the portion with the concept "Captain America"). More information about associating concepts with video may be found in U.S. patent application Ser. No. 15/270,960, filed 20 Sep. 2016, which is incorporated by reference. In particular embodiments, the information associated with the user may include information about highlights that the user viewed or shared in the past (which may be indicative of the kind of portions the user finds noteworthy). As an example and not by way of limitation, the noteworthiness-score of a portion that includes the superhero character ManBearBird in a superhero-movie video may be increased if the user frequently shared highlights including ManBearBird in the past.

In particular embodiments, the prediction of noteworthy portions for a video may be based on information associated with a creator or an uploader of the video (e.g., so as to customize the prediction for the creator or uploader). As an example and not by way of limitation, information about noteworthy portions that were previously specified in other videos by the creator (or uploader) of a particular video may be used to predict noteworthy portions for the video. For example, the creator may have frequently specified portions of football videos that included tackles made by a particular player, and this information may be used to predict noteworthy portions of the particular video (e.g., portions that include tackles made by the particular player). As another example and not by way of limitation, only user-engagement information associated with users of a particular group (e.g., a group of users for whom the creator has a relatively high affinity) may be considered in predicting noteworthy portions. Alternatively, such user-engagement information may be weighted higher than user-engagement information associated with users who are not of the particular group.

In particular embodiments, certain factors may be negative factors that decrease the noteworthiness-score of a portion. As an example and not by way of limitation, a comment with the text "this is boring" may decrease the noteworthiness-score of a portion. In these embodiments, the noteworthiness-score may be calculated based on, for example, a weighted sum of the positive and negative factors.

In particular embodiments, the computing system may extract one or more highlights from the first video. The highlights may correspond to noteworthy portions (e.g., noteworthy portions that are specified by a publisher/creator/viewer, ones that are predicted by the computing system, or any suitable combination). In particular embodiments, each highlight may be a representation of a noteworthy portion. The highlight may be in any suitable format. As an example and not by way of limitation, the highlight may be a video clip (e.g., an MPEG video), or one or more image frames (e.g., an animated GIF that may be a series of image frames that are configured to be played in success to emulate the corresponding video portion).

Figure 2:
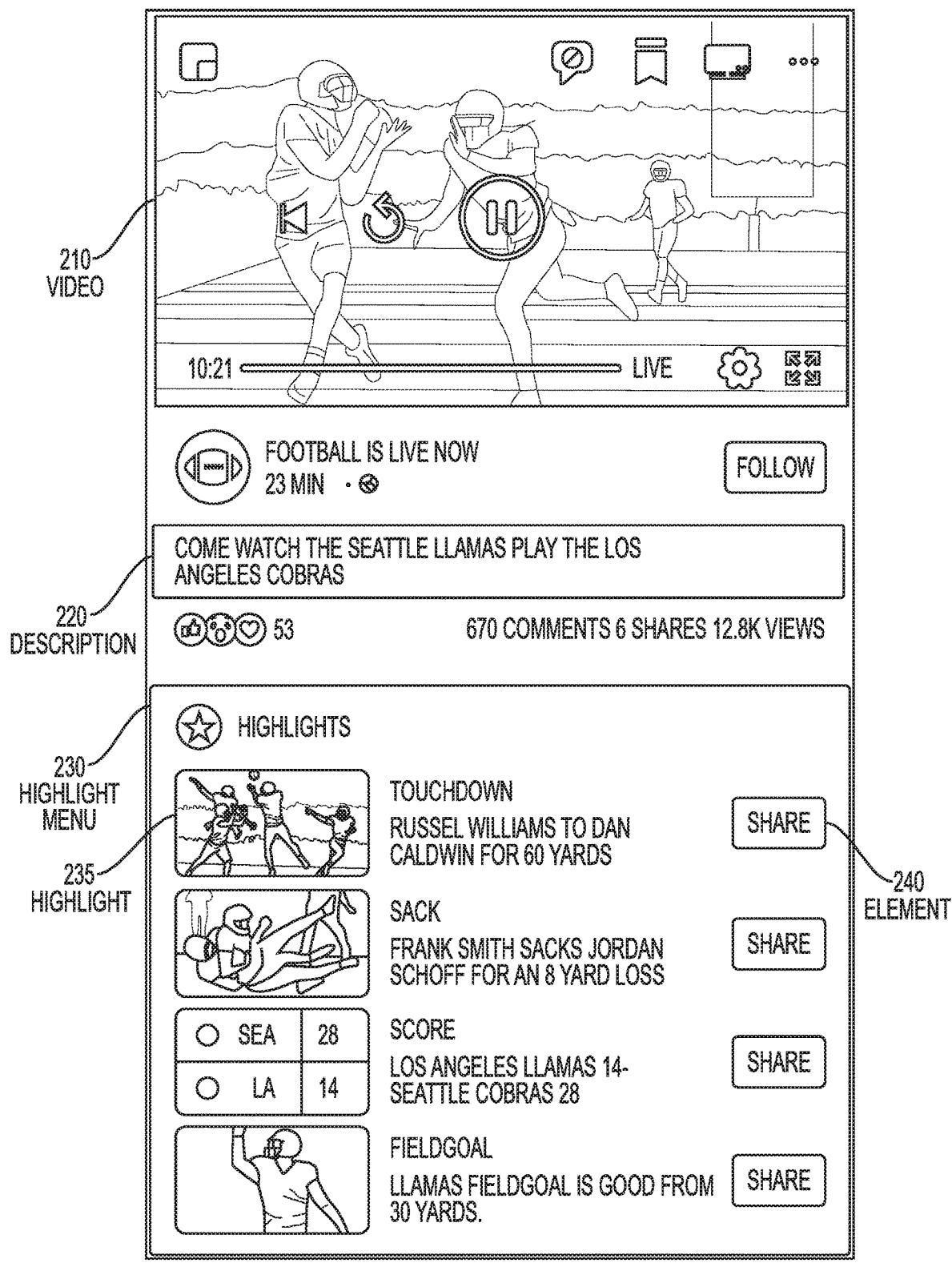
FIG. 2 illustrates an example interface including a video and several associated highlights.

FIG. 2 illustrates an example interface including a video and several associated highlights. In particular embodiments, the computing system may send, to a client system (e.g., of a user), information configured to render one or more highlights (e.g., highlights corresponding to predicted and/or specified noteworthy portions). As an example and not by way of limitation, referencing FIG. 2, the computing system may send information configured to display several highlights (e.g., the highlight 235) within a highlight menu 230. In particular embodiments, these highlights may be sent automatically to the client system when a trigger event occurs. In particular embodiments, trigger event may be an event that indicates an interest in an associated video by the user of the client system. As an example and not by way of limitation, a trigger event may include the launching of the first video. In this example, a user who launches the first video (e.g., a live broadcast of a football game) may receive one or more highlights corresponding to portions that already occurred. As another example and not by way of limitation, the trigger event may be the receipt of a particular input from the user of the client system. For example, when watching the video, the user may select an interactive element, such as a "Highlights" button to summon up a menu of highlights for the video. As an example and not by way of limitation, the highlights may be sent to a user when the user visits a page or interface associated with the video or a topic associated with the video. For example, a user may input the search query "world cup 2018" into a search bar of an online social network, and a page or interface associated with the 2018 FIFA World Cup may be returned. This page or interface may include, among other things, various highlights extracted from videos. As another example and not by way of limitation, a user may input the search query "car explosion" while a movie is playing, and a portion of the movie where car explodes may be highlighted or otherwise flagged for the user (alternatively, the movie may skip to that portion). As described in the context of predicting noteworthy portions, the highlights that are sent to a particular user may be customized for the user (based on a prediction of what the particular user may find noteworthy). As an example and not by way of limitation, a user who likes the character ManBearBird may be receive highlights of a superhero-movie video that include ManBearBird, while a user who likes the character Doctor Chaos may receive highlights that include Doctor Chaos for the same video. In particular embodiments, the highlights may be presented alongside the video in any suitable location. As an example and not by way of limitation, interactive elements for the highlights (e.g., links that can be selected by a user to launch corresponding highlights) may be presented directly below the video such that a user viewing the video may be able to see them if the user were to scroll down (e.g., referencing FIG. 2, within the highlight menu 230). As another example and not by way of limitation, interactive elements for the highlights may be overlaid on top of the video in any suitable location. As another example and not by way of limitation, a suitable visual marker may be overlaid on a timeline of the video (e.g., a large dot, a line of a different color), and a user may be able to simply tap/click on or scrub to a particular highlight to skip to the portion of the video associated with the highlight. For example, referencing FIG. 1, the video 110 may be rendered on a client system with the timeline 115, on which visual markers such as the one corresponding to the portion time range 120 may be overlaid. In this example, a user may tap on the portion time range 120 to immediately play the video from the associated portion 125 (or immediately before the portion). Alternatively, the user may scrub the movable scrubber 117 to a location on the timeline 115 at or around the portion time range 120 to immediately play the video from the location (or from the beginning of the portion 125.

In particular embodiments, the computing system may suggest candidate highlights to a publisher or a creator of the video (e.g., based on the predicted noteworthy portions). In these embodiments, the publisher or the creator may select one or more of the candidate highlights for sending to client systems. This suggestion feature may be advantageous in that it may help the publisher or the creator by identifying a subset of portions that the publisher or the creator might find noteworthy, such that it simplifies the task of finding highlights for a video—a task that may be particularly onerous for a lengthy video. In particular embodiments, the publisher or the creator may have the final decision over the highlights that are created. This may give a level of control to the publisher or the creator as to what portions are deemed to be most noteworthy, and as to what portions are most likely to be shared as highlights.

In particular embodiments, a user may select and share highlights with other users. As an example and not by way of limitation, the user may share a particular highlight on a newsfeed interface of an online social network (e.g., by including it in a post or status update on the online social network). As another example and not by way of limitation, the user may include a highlight of a video within a comment thread that is associated with the video. As another example, the user may share it on a page or interface associated with another user (e.g., a social-network connection of the user) on an online social network. As another example and not by way of limitation, user may send it directly to other users (e.g., as a private message). In particular embodiments, other users may view the highlight, reshare the post/highlight, or otherwise engage with the post or highlight (e.g., submitting reactions, comments, video annotations). In particular embodiments, the computing system may facilitate the sharing of highlights by providing an interactive element associated with a highlight that a user may select to quickly share the highlight. As an example and not by way of limitation, referencing FIG. 2, a user may be able to share the highlight 235 by selecting the interactive element 240. In particular embodiments, a user may select this interactive element, causing a social-network post or message that includes the highlight to be prepopulated. The user may then quickly share this post or message with other users (e.g., on an online social network).

Figure 3B:
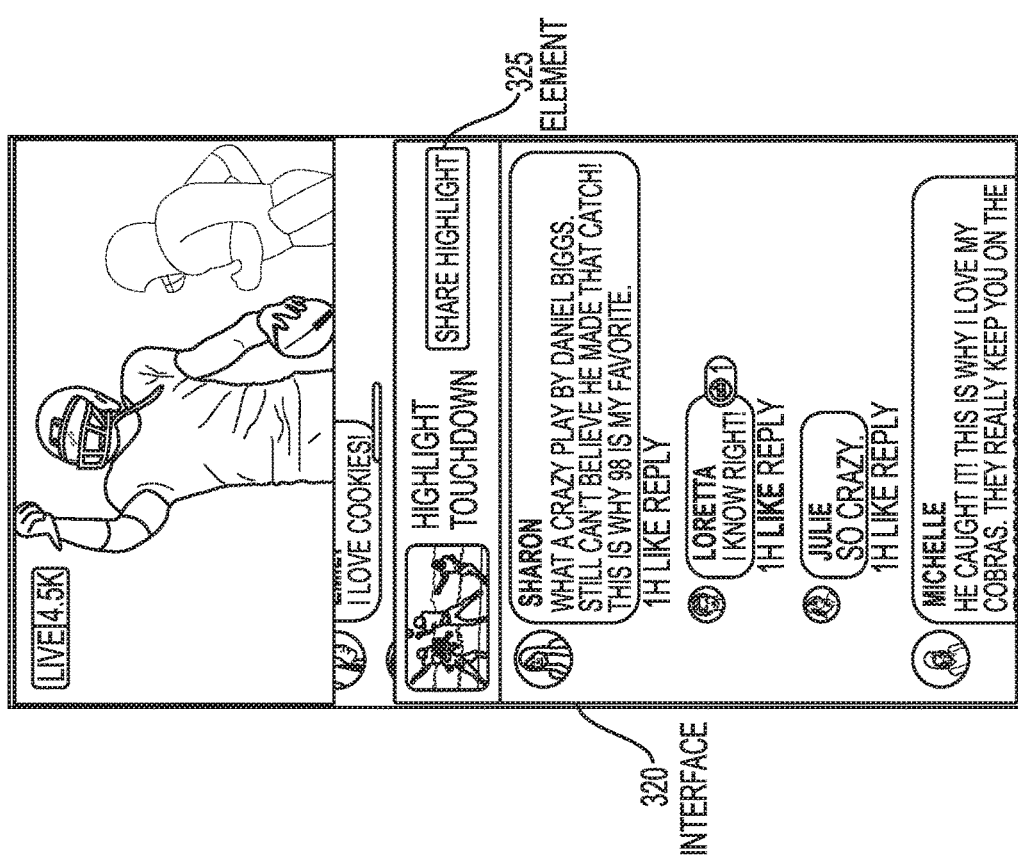
FIGS. 3A-3E illustrate an example method of sharing a highlight on an online social network.
Figure 3A:
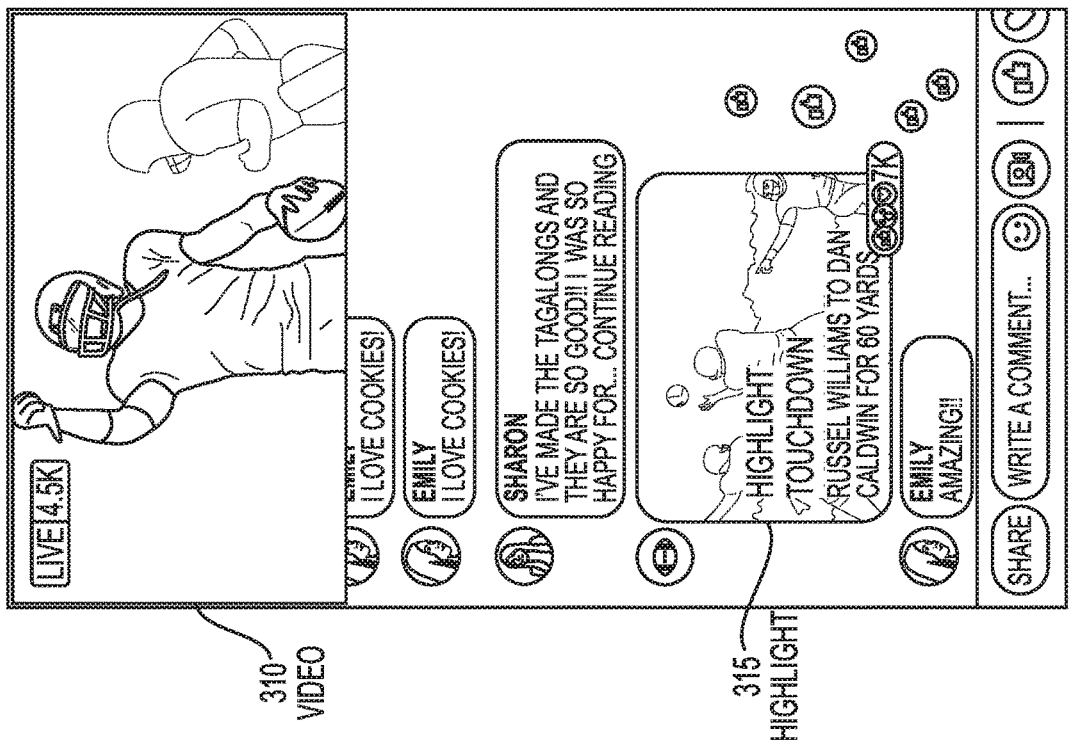
Figure 3C:
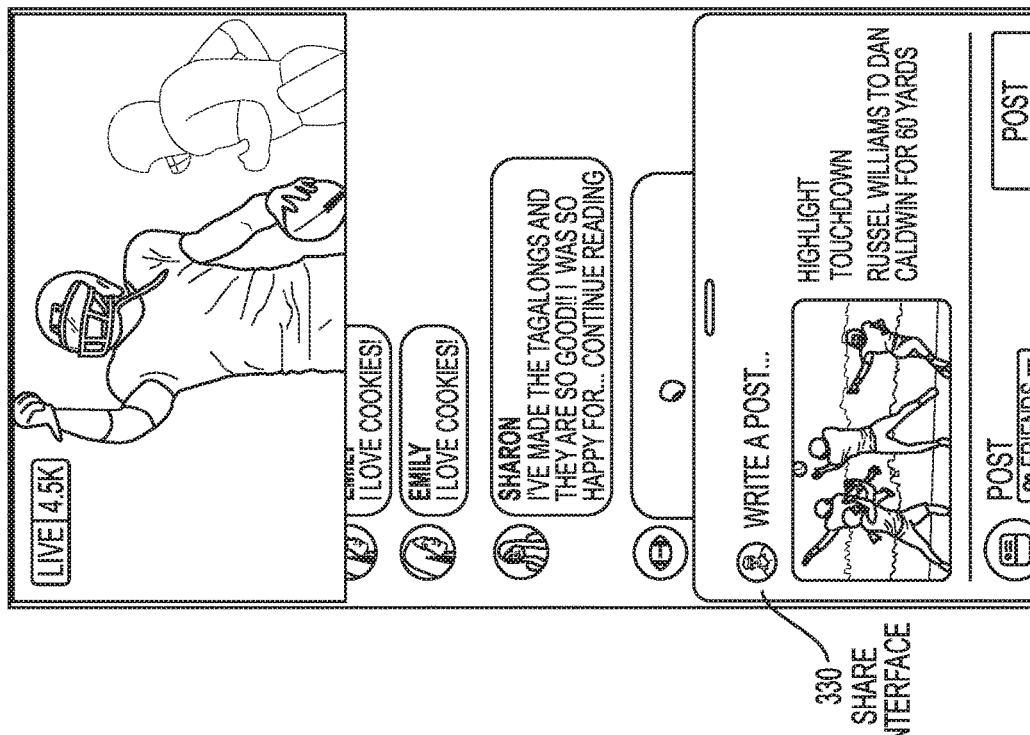
Figure 3D:
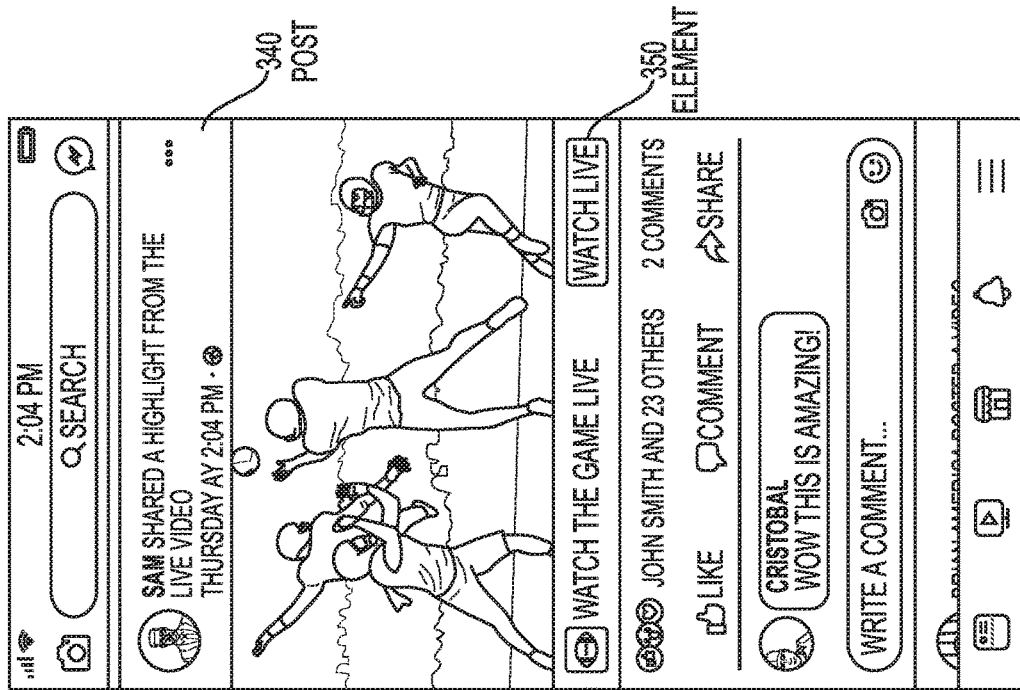
Figure 3E:
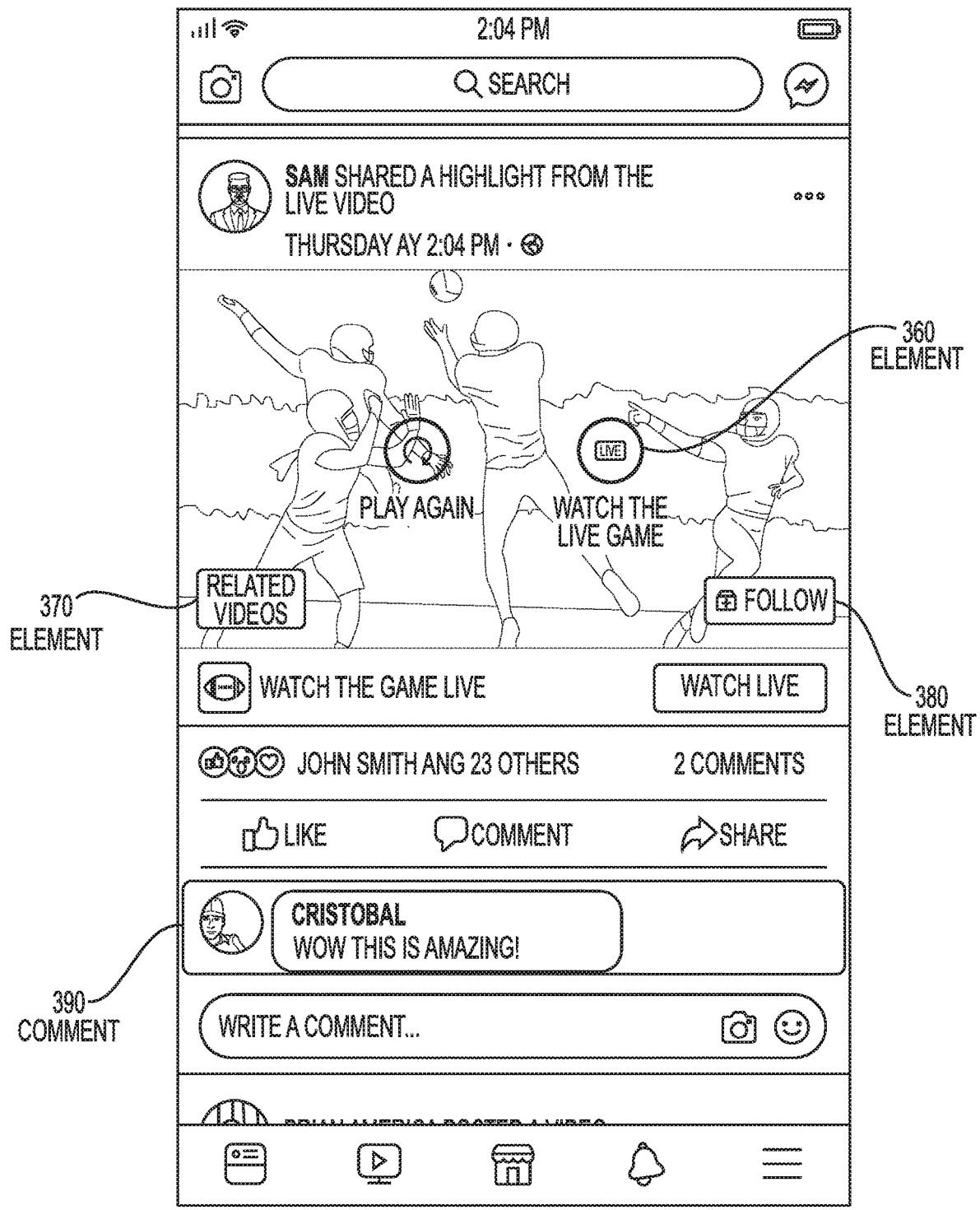

FIGS. 3A-3E illustrate an example method of sharing a highlight on an online social network. Referencing FIG. 2, a user viewing the video 210 may discover a highlight 235 that may have been shared by, for example, a publisher of the video 210. In particular embodiments, the user may at this point view and/or share the highlight 235 as a comment to the video 310 (which may be the video 210 in FIG. 2, or a different video), as shown in FIG. 3A, where it is shared as the highlight 315. For example, the user may select the highlight 315 by tapping on it and selecting an option to share it as a comment or a post. In particular embodiments, now referencing FIG. 3B, the interface 320, which is associated with the highlight 315 may appear in response to the user selection of the highlight 315. In particular embodiments, this interface may include comments or other information (e.g., a description, a title) associated with the highlight 315. In particular embodiments, the interface may also include the interactive element 325, which the user may select if the user wishes to share the highlight 315 with other users. In particular embodiments, referencing FIG. 3C, the user may be presented with the share interface 330, which may facilitate the sharing process by prepopulating a post with a link to the highlight 315. In particular embodiments, the user may be able to specify how the content is to be shared. As an example and not by way of limitation, referencing FIG. 3C, the user may be able to select a subset of users who would be able to see the highlight once it is shared by adjusting the share settings 330, which may define the privacy settings associated with the shared highlight (e.g., allowing the highlight to be seen by first-degree social-network connections only, by the general public, by specific users, by users who are members of a specific group, etc.). In particular embodiments, referencing FIG. 3D, the user may share the highlight within the post 340. In particular embodiments, other users may engage with the highlight or the post. As an example and not by way of limitation, a user may submit the comment 390, which may be a comment to the post 340 ("Wow this is amazing!"). In this example, other users may submit additional comments to create an ongoing conversation, which may ultimately promote the video 310 (e.g., to users who may otherwise not have been interested in the video 310). Although a particular set of steps are described in a particular sequence with respect to FIGS. 3A-3E for illustrative purposes, this disclosure contemplates performing any suitable subset of these steps in any suitable order.

In particular embodiments, the computing system may also send one or more interactive elements. In particular embodiments, one or more of these interactive elements may be "call-to-action" elements that prompt the user to engage with or view video content. As an example and not by way of limitation, an interactive element may be configured to launch the first video on the client system (e.g., the interactive element 350 in FIG. 3D, the interactive element 360 in FIG. 3E). As another example and not by way of limitation, an interactive element may include links to one or more similar or related videos (e.g., the interactive element 370 in FIG. 3E) or other related content (e.g., an article about a topic associated with the video). As another example and not by way of limitation, an interactive element may allow the user to follow or subscribe to the publisher or the creator of a video from which the highlight was extracted, or to follow or subscribe to a person who shared the highlight (e.g., the interactive element 380 in FIG. 3E). In this example, once the user has subscribed, the user may receive notifications of future videos (or highlights). For example, the user may receive a notification the next time the creator of a live video broadcasts another live video. These interactive elements may be presented during the presentation of the highlight, at the end of the highlight, or at any suitable time.

The call-to-action aspect of the interactive elements may allow a highlight to serve as a jumping-off point to view or engage with video content that a user may be interested in (e.g., as determined by the user's watching of the highlight). This divergence from the traditional understanding of highlights (as merely compilations of noteworthy moments in a video) is particularly pronounced in the case of live videos, where the highlights may be used to encourage users to view or engage with live video in real-time, and not just view highlights of events that have already occurred. As an example and not by way of limitation, a first user may share, within a post on an online social network, a highlight from a video of a basketball game as the basketball game is being broadcasted live. In this example, a second user may view the highlight (e.g., which may include an exciting slam dunk) and may be presented with an interactive element prompting the second user to view the live broadcast. The second user in this example may have enjoyed the highlight and may consequently opt to view the live broadcast by selecting the interactive element. As a result, the live broadcast may receive a new viewer that may not have otherwise viewed the broadcast.

In particular embodiments, highlights may be sent to a client system as a means of quickly catching up to events that have occurred in the video or in related videos (e.g., past videos in a series of videos). This feature may be particularly useful in encouraging users to watch live videos as they unfold in real-time. As an example and not by way of limitation, a user may quickly view highlights of pre-recorded video (e.g., video that was recorded as the live video was being broadcast) before skipping to the live portion of the video. One challenge with getting users to view or engage with live videos stems from users not joining the live broadcast when it starts (or sufficiently close to the beginning of the video). In these cases, these users may feel like they would not have sufficient background to be able to join the live broadcast and may choose to simply view the video from the beginning (i.e., not in real-time). This may result in the loss of a significant number of users who would otherwise have been able to engage with the live video in real-time. For example, a broadcaster might want to receive feedback from his or her viewers (e.g., as comments) about a topic that the broadcaster is discussing in a live video. Users given the opportunity to quickly catch up by viewing noteworthy portion of the video as highlights may be likely to skip to and engage with the live portion after catching up.

Figure 4:
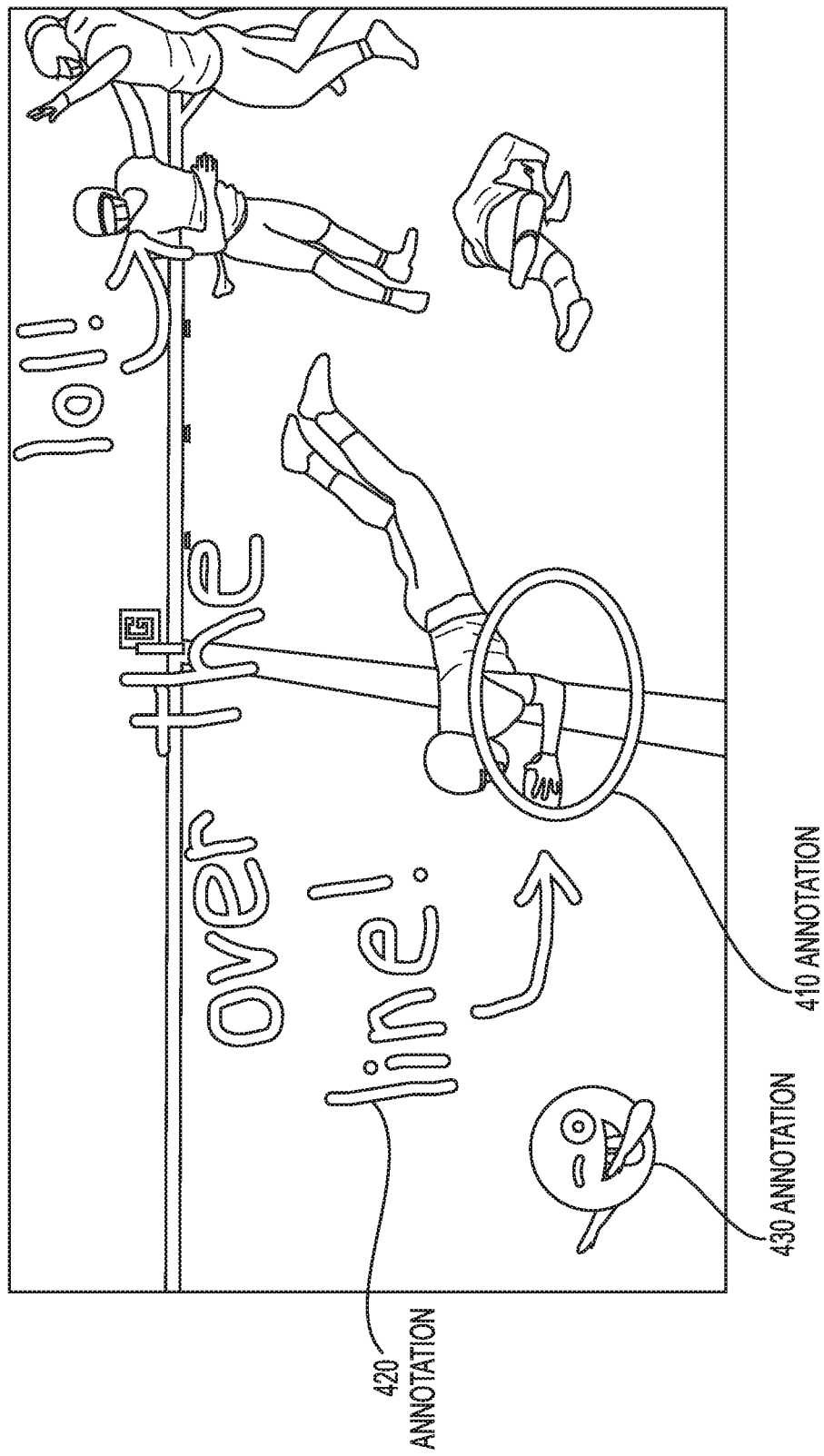
FIG. 4 illustrates an example of video annotations made to a highlight.

FIG. 4 illustrates an example of video annotations made to a highlight. In particular embodiments, a highlight may be associated with a description, title, video annotations, or other such clarifying content. This clarifying content may be added by an entity that specified or predicted the noteworthy portion that was to be extracted as a highlight. As an example and not by way of limitation, a publisher, a creator, or a viewer user who specified a time range as a noteworthy portion to be extracted as a highlight may add a title or description (e.g., referencing FIG. 1, the description 220). As another example and not by way of limitation, the publisher/creator/viewer user may alter the content with a video annotation that marks up or otherwise annotates the video content in a highlight (e.g., by overlaying a drawing or other content over one or more frames of the video). For example, referencing FIG. 4, a viewer user may draw a circle (e.g., the annotation 410) around a region of the video where a touchdown occurred, and may add textual video annotations (e.g., the annotation 420) or image video annotations (e.g., the annotation 430). Alternatively or additionally, another entity (e.g., a user simply viewing the highlight) may add clarifying content or edit clarifying content (e.g., by altering an existing clarifying content that was added by a different entity) to the highlight prior to sharing the highlight.

In particular embodiments, the computing system may suggest clarifying content for highlights (e.g., to the publisher or the creator, to users who are about to share a highlight). In particular embodiments, to make these suggestions, the computing system may leverage a machine learning model that has been trained using a training set of highlights for which users (e.g., of an online social network) may have submitted video annotations, descriptions, titles, reactions, comments, or other user inputs. The machine learning model may output suggestions based on the training set and information associated with the training set. As an example and not by way of limitation, the machine learning model may suggest a title or description for a highlight that includes a touchdown, where the suggested title or description may be based on titles or descriptions of similar highlights in the training set that received a large number of views or shares. As another example and not by way of limitation, the machine learning model may suggest particular types of video annotations for the touchdown highlight (e.g., referencing FIG. 4, the annotation 410, which may be a circle around an area where a touchdown occurs) based on a frequency of such types of video annotations in similar highlights in the training set.

In particular embodiments, portions (e.g., noteworthy portions) may be categorized by the computing system. This categorization may, for example, be based on concepts associated with the portions. In particular embodiments, the categorizations may be leveraged to allow users to search for particular events in a video based on the categorization. As an example and not by way of limitation, a large number of users may submit the comment "touchdown!" when a touchdown occurs in a football video. The computing system may associate this portion of the video with the concept "Touchdown," and users may subsequently locate that portion by searching "touchdown." As another example, a large number of users may submit an "angry" reaction during a video when a villain does something wily. In this example, a user may be able to search for all portions where a large number of users submitted "angry" reactions by selecting a suitable button that may filter for such portions. In particular embodiments, the categorizations can also be used to automatically generate compilations. As an example and not by way of limitation, a creator/publisher/viewing user (or any other user) may submit a request to the computing system for a compilation of all touchdowns. In response, the computing system may create a highlight reel that compiles all touchdowns by compiling portions of the video that are categorized or otherwise associated with the concept "Touchdown."

In particular embodiments, information associated with a video or with a publisher/creator may be used to discover videos that are linked, for example, to a particular event. As an example and not by way of limitation, several users may be sharing live videos of a concert (or sporting event, or any other suitable event) from different perspectives. These videos may be linked to the concert based on text in comments, hashtags, a check-in status update, geo-location, or any other suitable information. A user interested in viewing videos of the concert may be able to switch among the different videos (assuming privacy settings of the videos grant the user permission to view them) to view the concert from various perspectives.

Figure 5:
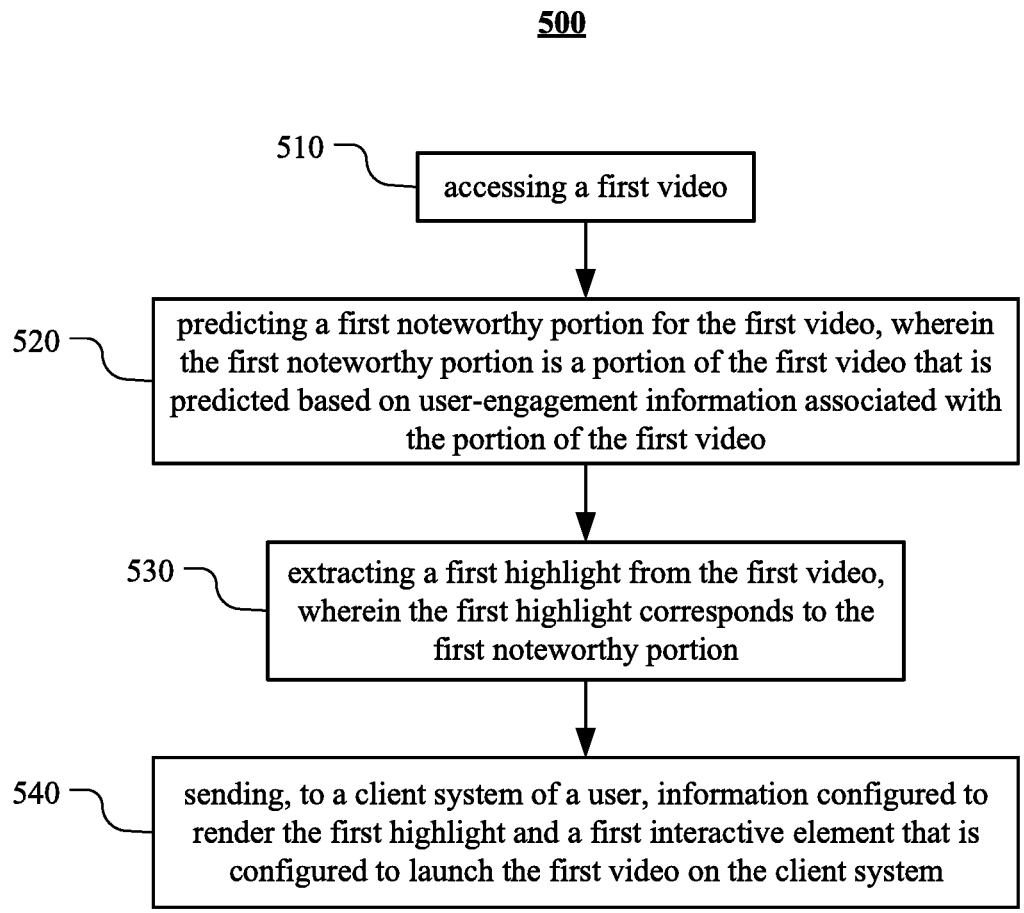
FIG. 5 illustrates an example method for predicting and sending highlights to a client system.

FIG. 5 illustrates an example method 500 for predicting and sending highlights to a client system. The method may begin at step 510, where a computing system may access a first video. At step 520, the computing system may predict a first noteworthy portion for the first video, wherein the first noteworthy portion is a portion of the first video that is predicted based on user-engagement information associated with the portion of the first video. At step 530, the computing system may extract a first highlight from the first video, wherein the first highlight corresponds to the first noteworthy portion. At step 540, the computing system may send, to a client system of a user, information configured to render the first highlight and a first interactive element that is configured to launch the first video on the client system. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for predicting and sending highlights to a client system, including the particular steps of the method of FIG. 5, this disclosure contemplates any suitable method for predicting and sending highlights to a client system including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

System Overview

Figure 6:
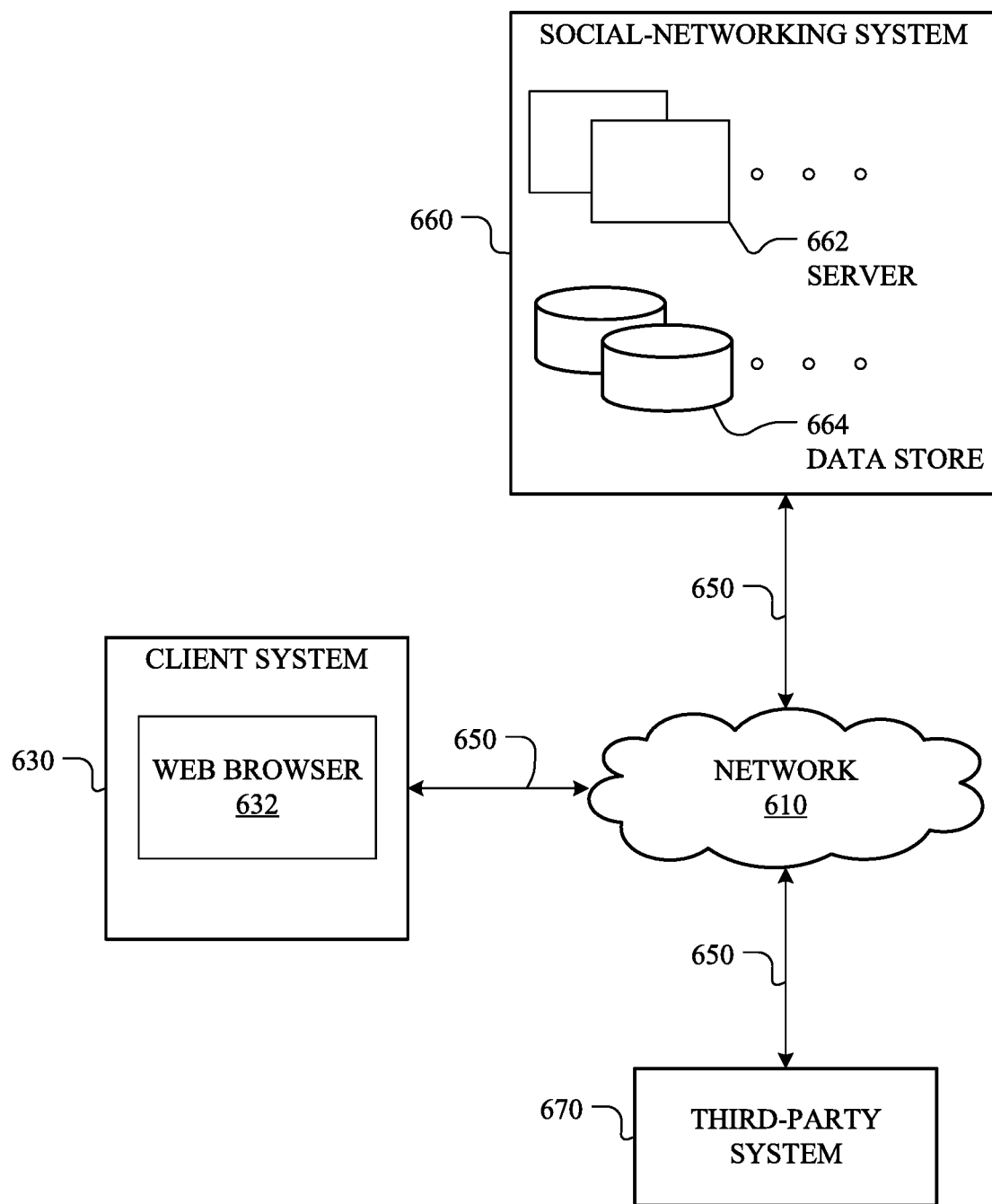
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system

660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 7:
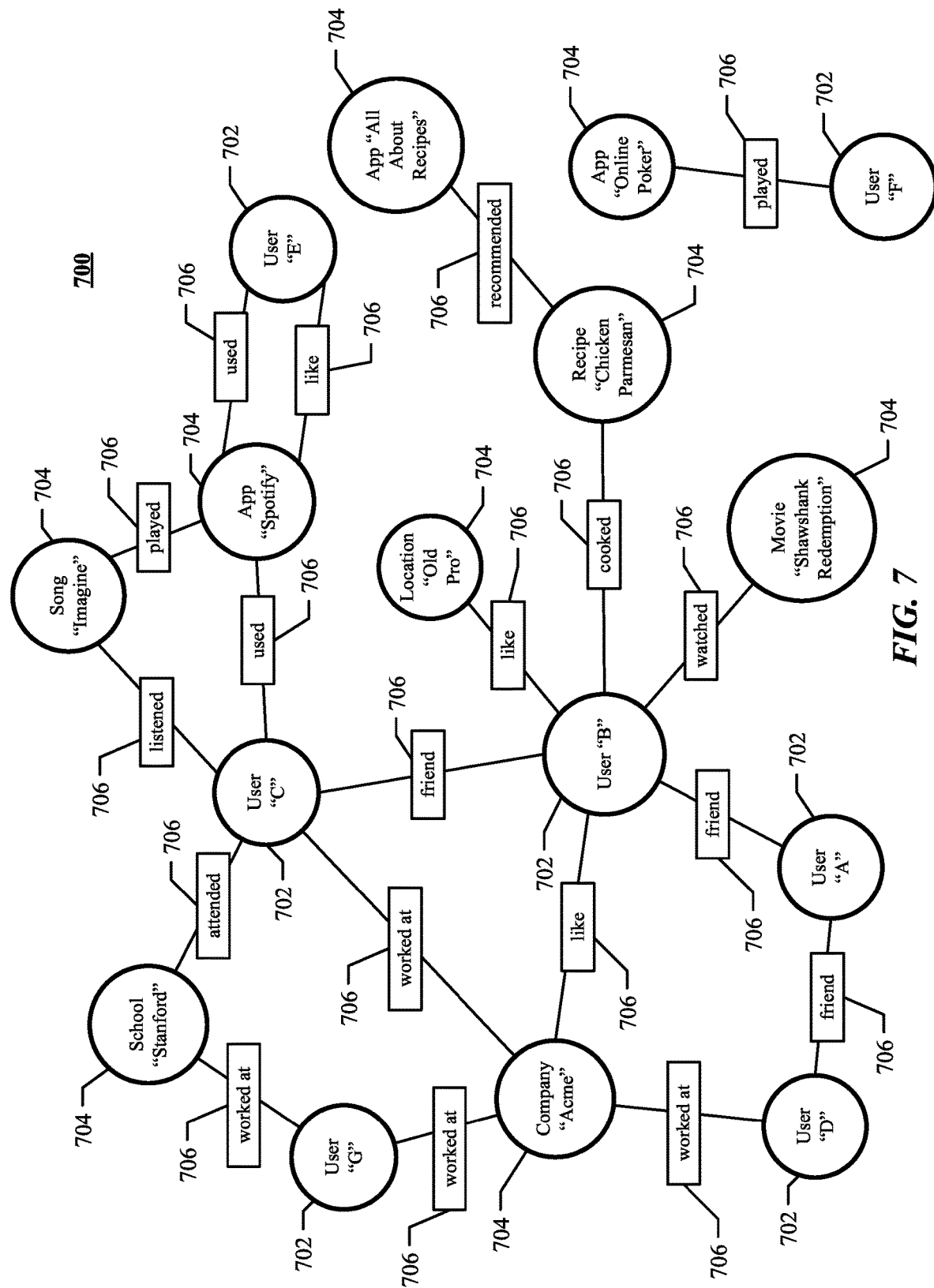
FIG. 7 illustrates an example social graph.

FIG. 7 illustrates example social graph 700. In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. Example social graph 700 illustrated in FIG. 7 is shown, for didactic purposes, in a two-dimensional visual map representation. In particular embodiments, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 660 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Social Graph Affinity and Coefficient

In particular embodiments, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 660 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or more of the actions indicate an affinity for subject matter, content, other users, and so forth. As an example and not by way of limitation, if a user frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 660 may calculate a coefficient based on the type of relationship between particular objects. Referencing the social graph 700, social-networking system 660 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than user nodes 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular embodiments, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, social-networking system 660 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 630 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular embodiments, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular embodiments, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular embodiments, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular embodiments, privacy settings may allow users to opt in or opt out of having their actions logged by social-networking system 660 or shared with other systems (e.g., third-party system 670). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may only be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 8:
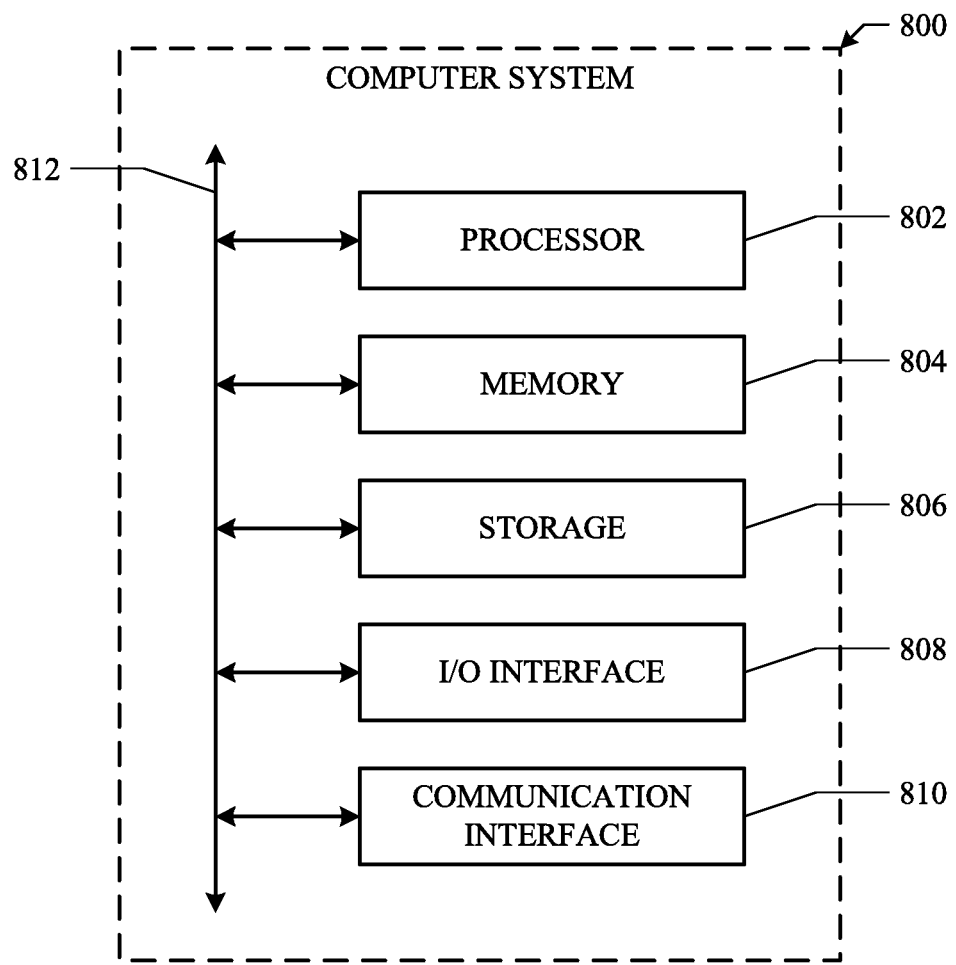
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a server computing machine:
   accessing a first video;
   predicting a first noteworthy portion for the first video via a calculation of a noteworthiness-score for the first noteworthy portion, wherein the calculation of the noteworthiness-score is based on a weighted sum of different sub-scores calculated based on different factors related to user-engagement information associated with the portion of the first video, wherein the first noteworthy portion is predicted to be noteworthy when it exceeds a threshold noteworthiness-score, and the weights for each factor are variable according to a plurality of variables, the plurality of variables including a decay factor that relates to a strength of a signal provided by user-engagement actions decaying over time;

extracting a first highlight from the first video, wherein the first highlight corresponds to the first noteworthy portion;

sending, to a client system of a user, information configured to render the first highlight;

causing a generation, on the client system, of a first interactive element that is configured to launch the first highlight on the client system; and causing a generation, on the client system in response to a user selection of the first highlight, of an interface associated with the first highlight, the interface including comments or other information associated with the first highlight and a second interactive element to facilitate sharing of the first highlight with other users.

2. The method of claim 1, wherein the user-engagement information comprises information about a number of user-engagement actions that occurred within a particular time range associated with the first video, wherein the first noteworthy portion occurs in the first video within the particular time range.

3. The method of claim 2, wherein the user-engagement actions comprise one or more of likes, reactions, comments, and reshares.

4. The method of claim 1, wherein the user-engagement information comprises information about a number of users viewing the first video during a particular time range associated with the first video, wherein the first noteworthy portion occurs in the first video within the particular time range.

5. The method of claim 1, wherein the first highlight comprises a video clip.

6. The method of claim 1, wherein the first highlight comprises one or more image frames.

7. The method of claim 1, further comprising:
receiving, from the client system of the user, an input indicating a selection of the first interactive element by the user; and
in response to the input, causing the first video to be launched on the client system of the user.

8. The method of claim 1, further comprising: sending information configured to render a third interactive element that is configured to launch a second video, wherein the second video is related to the first video.

9. The method of claim 1, further comprising: sending information configured to render a third interactive element that is configured to subscribe the user to a publisher or creator of the first video.

10. The method of claim 1, wherein the first video is a live video.

11. The method of claim 1, further comprising:
receiving, from the client system of the user, an input for sharing the first highlight; and
causing the first highlight to be shared on an online social network.

12. The method of claim 11, wherein the first highlight is shared within a comment-thread interface of the online social network, wherein the comment-thread interface is associated with the first video.

13. The method of claim 11, wherein the first highlight is shared on a newsfeed interface of the online social network.

14. The method of claim 1, further comprising:
receiving an instruction from the client system of the user to create an annotation to the first highlight; and
annotating the first highlight in accordance with the instruction.

15. The method of claim 1, further comprising:
suggesting, to a publisher or creator of the video, the first noteworthy portion as a candidate for a highlight; and
receiving, from the publisher or creator of the video, an instruction selecting the first noteworthy portion for extraction.

16. The method of claim 1, wherein the first noteworthy portion is predicted based on information associated with the user, wherein the information associated with the user is based on a determined affinity between the user and a concept associated with the first noteworthy portion.

17. The method of claim 1, further comprising:
determining a concept associated with the first noteworthy portion based on the user-engagement information, wherein the user-engagement information comprises text extracted from user comments associated with the first noteworthy portion;
receiving a search query comprising a search term associated with the determined concept; and
returning the first highlight in response to the search query.

18. The method of claim 1, further comprising:
determining a shared concept associated with the first noteworthy portion and one or more second noteworthy portions; and
creating a highlight reel, wherein the highlight reel comprises the first highlight and one or more second highlights corresponding to one or more of the second noteworthy portions.

19. One or more computer-readable non-transitory storage media embodying software that is operable when executed to:
access a first video;
predict a first noteworthy portion for the first video via a calculation of a noteworthiness-score for the first noteworthy portion, wherein the calculation of the noteworthiness-score is based on a weighted sum of different sub-scores calculated based on different factors related to user-engagement information associated with the portion of the first video, wherein the first noteworthy portion is predicted to be noteworthy when it exceeds a threshold noteworthiness-score, and the weights for each factor are variable according to a plurality of variables, the plurality of variables including a decay factor that relates to a strength of a signal provided by user-engagement actions decaying over time;
extract a first highlight from the first video, wherein the first highlight corresponds to the first noteworthy portion; and
send, to a client system of a user, information configured to render the first highlight, generate a first interactive element that is configured to launch the first video on the client system, and generate on the client system in response to a user selection of the first highlight, an interface associated with the first highlight, the interface including comments or other information associated with the first highlight and a second interactive element to facilitate sharing of the first highlight with other users.

20. A system comprising: one or more processors; and one or more computer-readable non-transitory storage media coupled to one or more of the processors and comprising instructions operable when executed by one or more of the processors to cause the system to:
access a first video;
predict a first noteworthy portion for the first video via a calculation of a noteworthiness-score for the first noteworthy portion, wherein the calculation of the noteworthiness-score is based on user-engagement information associated with the portion of the first video, wherein the first noteworthy portion is predicted to be noteworthy when it exceeds a threshold noteworthiness-score, and the weights for each factor are variable according to a plurality of variables, the plurality of variables including a decay factor that relates to a strength of a signal provided by user-engagement actions decaying over time;

extract a first highlight from the first video, wherein the first highlight corresponds to the first noteworthy portion; and send, to a client system of a user, information configured to render the first highlight, generate a first interactive element that is configured to launch the first video on the client system, and generate on the client system in response to a user selection of the first highlight, an interface associated with the first highlight, the interface including comments or other information associated with the first highlight and a second interactive element to facilitate sharing of the first highlight with other users.

* * * * *